US012236634B1

(12) United States Patent
Chimalamarri

(10) Patent No.: US 12,236,634 B1
(45) Date of Patent: Feb. 25, 2025

(54) SUPPLEMENTING EYE TRACKING BASED ON DEVICE MOTION INFORMATION

(71) Applicant: Apple Inc., Cupertino, CA (US)

(72) Inventor: Anshu K. Chimalamarri, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/139,868

(22) Filed: Apr. 26, 2023

Related U.S. Application Data

(60) Provisional application No. 63/338,399, filed on May 4, 2022.

(51) Int. Cl.
  *G06T 7/73* (2017.01)
  *G06F 3/01* (2006.01)

(52) U.S. Cl.
  CPC ............... *G06T 7/73* (2017.01); *G06F 3/012* (2013.01); *G06F 3/013* (2013.01)

(58) Field of Classification Search
  CPC ............ G06T 7/73; G06F 3/012; G06F 3/013
  See application file for complete search history.

(56) References Cited

U.S. PATENT DOCUMENTS

| | | |
|---|---|---|
| 10,268,266 B2 | 4/2019 | Mathey-Owens et al. |
| 10,684,485 B2 | 6/2020 | Stafford et al. |
| 2020/0081524 A1 | 3/2020 | Schmidt et al. |
| 2020/0319344 A1* | 10/2020 | Ronchini Ximenes ... G06T 7/50 |
| 2021/0035264 A1* | 2/2021 | Li .................. G02B 27/017 |
| 2021/0142145 A1* | 5/2021 | Bastani ............... G06F 3/0346 |
| 2022/0146819 A1* | 5/2022 | Boyle ............... G02B 27/0093 |

* cited by examiner

*Primary Examiner* — Sahlu Okebato
(74) *Attorney, Agent, or Firm* — Fernando & Partners, LLP

(57) ABSTRACT

In accordance with some implementations, a method is performed at an electronic device with one or more processors, a non-transitory memory, an image sensor, and a positional sensor. The method includes capturing image data of an eye using the image sensor. The method includes, while the electronic device is in a first position, determining a gaze vector based on the image data. The method includes detecting, based on positional sensor data from the positional sensor, a positional change of the electronic device from the first position to a second position. The method includes, in response to detecting the positional change, updating the gaze vector based on the positional sensor data. In some implementations, updating the gaze vector includes repositioning the gaze vector. In some implementations, updating the gaze vector includes increasing a targeting tolerance associated with the gaze vector.

20 Claims, 13 Drawing Sheets

SUPPLEMENTING EYE TRACKING BASED ON DEVICE MOTION INFORMATION

CROSS-REFERENCE TO RELATED APPLICATIONS

This application claims priority to U.S. Provisional Patent App. No. 63/338,399, filed on May 4, 2022.

TECHNICAL FIELD

The present disclosure relates to eye tracking and, in particular, determining a gaze vector.

BACKGROUND

In various circumstances, an electronic device determines a gaze vector associated with an eye of a user. For example, the electronic device determines the gaze vector by tracking an eye within image data (e.g., a series of images) of the eye. However, tracking the eye within the image data is computationally expensive, and therefore the eye tracking may substantially lag the actual eye position of the user. Moreover, the lag may be exacerbated based on motion of the electronic device.

SUMMARY

In accordance with some implementations, a method is performed at an electronic device with one or more processors, a non-transitory memory, an image sensor, and a positional sensor. The method includes capturing image data of an eye using the image sensor. The method includes, while the electronic device is in a first position, determining a gaze vector based on the image data. The method includes detecting, based on positional sensor data from the positional sensor, a positional change of the electronic device from the first position to a second position. The method includes, in response to detecting the positional change, updating the gaze vector based on the positional sensor data.

In accordance with some implementations, an electronic device includes one or more processors, a non-transitory memory, an image sensor, and a positional sensor. One or more programs are stored in the non-transitory memory and are configured to be executed by the one or more processors. The one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION OF IMPLEMENTATIONS

Figure 1:
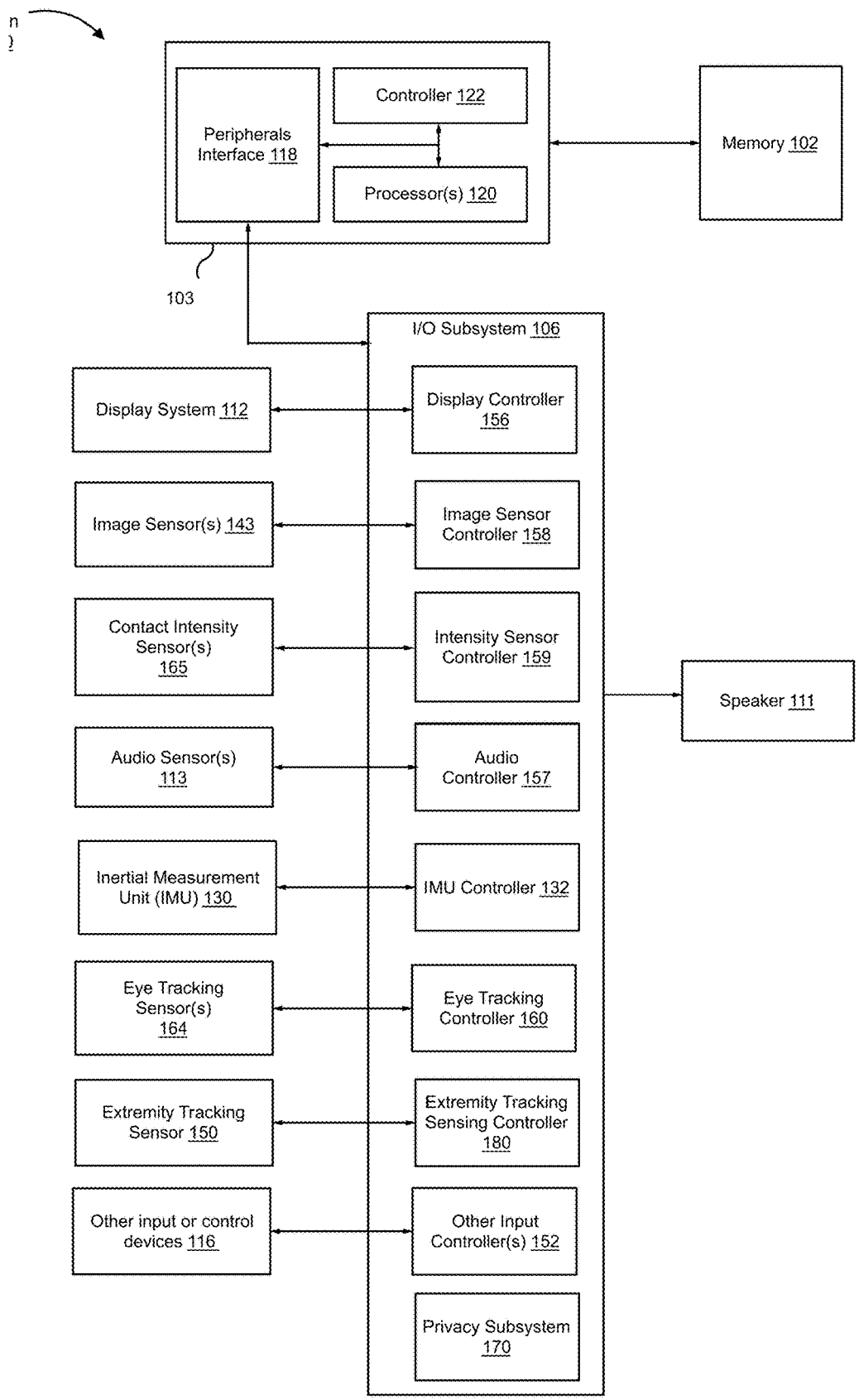
FIG. 1 is a block diagram of an example of a portable multifunction device in accordance with some implementations.

In various circumstances, an electronic device determines a gaze vector associated with an eye of a user. For example, the electronic device determines the gaze vector by tracking an eye within image data of the eye, such as via computer vision. Tracking the eye includes tracking a movement of the eye. The movement of the eye may be concurrent with a movement of the electronic device. As one example, an eye initially focuses on an object of interest. While the electronic device moves and in order to maintain the eye focus, the eye moves to account for the movement of the electronic device. However, tracking the eye within the image data is computationally expensive, and therefore the eye tracking may substantially lag the actual eye position of the user. Moreover, the lag may be exacerbated based on the motion of the electronic device.

By contrast, various implementations disclosed herein include methods, electronic devices, and systems for supplementing eye tracking based on device motion information. To that end, an electronic device includes an image sensor that captures image data of an eye of a user of the electronic device. While the electronic device is in a first position, the electronic device determines a gaze vector based on the image data, such as via computer vision. For example, the electronic device determines the gaze vector by identifying a first subset of pixels of a first image of the image data, wherein the first subset of pixels corresponds to the eye. As noted above, tracking the eye within the image data is computationally expensive (e.g., introduces latency). Accordingly, the electronic device assesses positional sensor data from a positional sensor in order to update the gaze vector. The positional sensor data indicates a positional change of the electronic device from the first position to a second position. For example, in some implementations, updating the gaze vector includes repositioning the gaze vector (e.g., changing the angle of the gaze vector). As another example, in some implementations, updating the gaze vector includes changing a targeting tolerance (e.g., for targeting an object) associated with the gaze vector, without repositioning the gaze vector. Assessing the positional sensor data is generally less computationally expensive than tracking the eye within the image data. Accordingly, in order to account for an eye movement concurrent with the positional change, assessing the positional sensor data enables the electronic device to update the gaze vector faster than by assessing the eye movement within the image data.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics.

As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, and a privacy subsystem 170. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, paired input device, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time of flight sensor that obtains depth information characterizing a particular object.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may have a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a paired input device.

In some implementations, the display system 112 corresponds to a display integrated in a head-mountable device (HMD), such as AR glasses. For example, the display system 112 includes a stereo display (e.g., stereo pair display) that provides (e.g., mimics) stereoscopic vision for eyes of a user wearing the HMD.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a paired input device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display. In some implementations, the eye tracking sensor(s) 164 include an image sensor that captures image data (e.g., a series of images) of an eye of a user. In some implementations, the eye tracking controller 160 tracks the eye within the image data, such as via computer vision.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

FIGS. 2A-2I are examples of updating a gaze vector based on positional sensor data in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

Figure 2A:
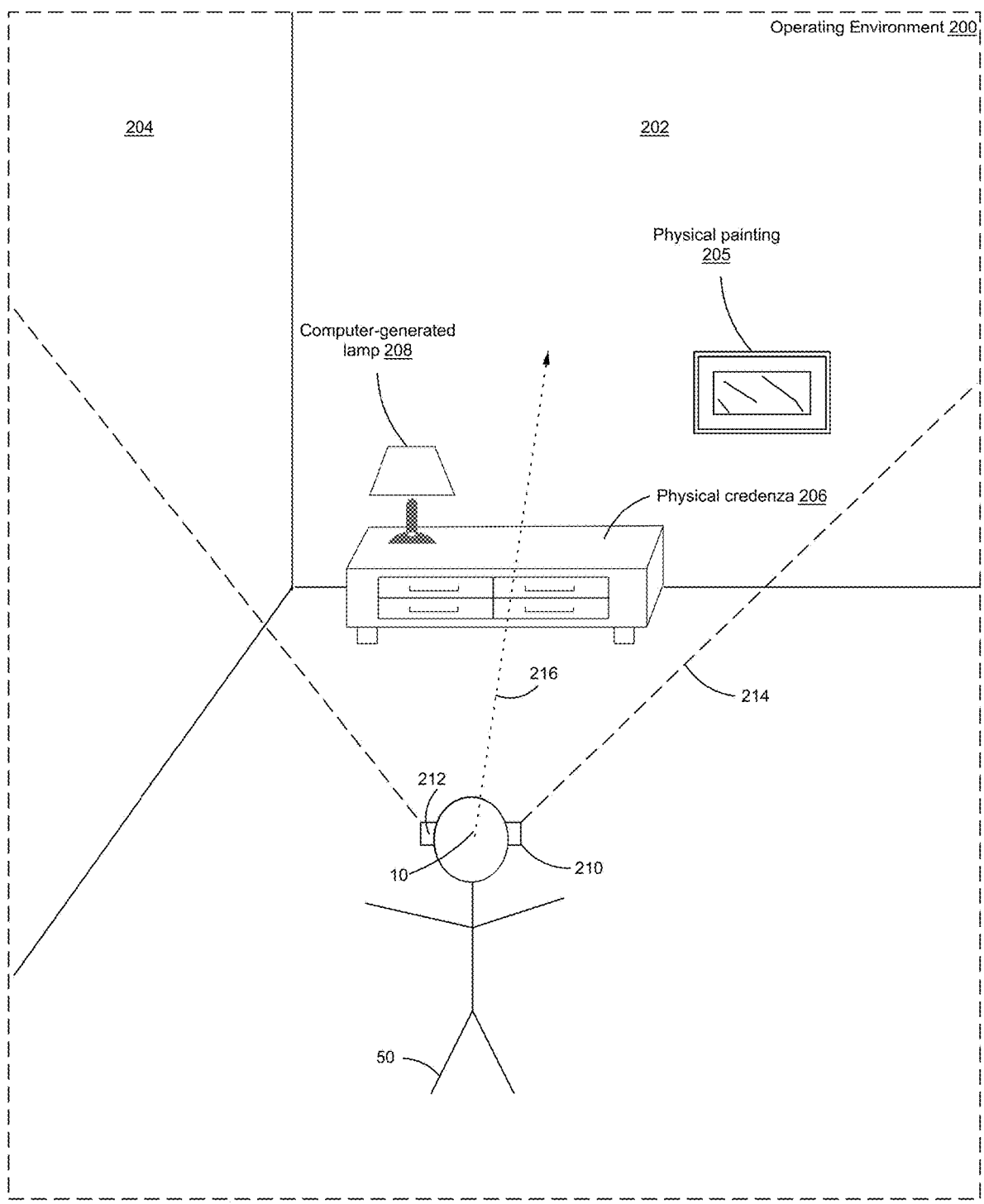
FIGS. 2A-2I are examples of updating a gaze vector based on positional sensor data in accordance with some implementations.

As illustrated in FIG. 2A, a user 50 wears a head-mountable device (HMD) 210 that operates according to an operating environment 200. The operating environment 200 includes a first physical wall 202, a second physical wall 204, a physical painting 205 hanging on the first physical wall 202, and a physical credenza 206. The operating environment 200 further includes a computer-generated lamp 208 (generated by the HMD 210). The computer-generated lamp 208 is anchored (e.g., world-locked) to the surface of the physical credenza 206. In some implementations, the operating environment 200 corresponds to an XR environment previously described. Although the examples described with reference to FIGS. 2A-2I, 3A-3B, and 4 include the HMD 210, one of ordinary skill in the art will appreciate that some implementations include another type of electronic device, such as a mobile device (e.g., a smartphone, tablet, etc.) including an image sensor and a positional sensor.

In some implementations, the HMD 210 includes an display 212 (e.g., a built-in display) that displays a representation of the operating environment 200. In some implementations, the HMD 210 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., a smartphone). For example, in some implementations, a smartphone slides/snaps into or otherwise attaches to the head-mountable enclosure. In some implementations, the display of the device attached to the head-mountable enclosure presents (e.g., displays) a representation of the operating environment 200. The display 212 includes a viewable region 214 that includes the first physical wall 202, the second physical wall 204, the physical painting 205, and the physical credenza 206. Accordingly, the HMD 210 displays, on the display 212, respective representations of the first physical wall 202, the second physical wall 204, the physical painting 205, and the physical credenza 206, in addition to displaying the computer-generated lamp 208.

As further illustrated in FIG. 2A, while the HMD 210 is in a first position, the HMD 210 is associated with a first head forward vector 216. The first head forward vector 216 is normal (e.g., orthogonal) to the HMD 210, and terminates at a point on the first physical wall 202. The first head forward vector 216 is a function of the current position (e.g., location and orientation) of the HMD 210. Accordingly, the first head forward vector 216 characterizes the first position of the HMD 210.

In various implementations, the HMD 210 includes a positional sensor that generates positional sensor data. Moreover, in some implementations, the HMD 210 determines a head forward vector (e.g., the first head forward vector 216) based at least in part on the positional sensor data. For example, with reference to FIG. 4, the HMD 210 includes a positional sensor 450, such as an inertial measurement unit (IMU). Moreover, the HMD 210 may include a motion system 432 that determines a head forward vector based on the positional sensor data from the positional sensor 450. Moreover, the motion system 432 may determine a movement type of the HMD 210 based on the positional sensor data, such as a rotational movement. The HMD 210 may also determine its location and orientation using image data from one or more image sensors (e.g., a second image sensor 402 illustrated in FIG. 4) alone or in combination with the positional sensor data from the positional sensor 450 using, for example, a visual odometry (VO) or visual inertial odometry (VIO) technique.

Figure 2B:
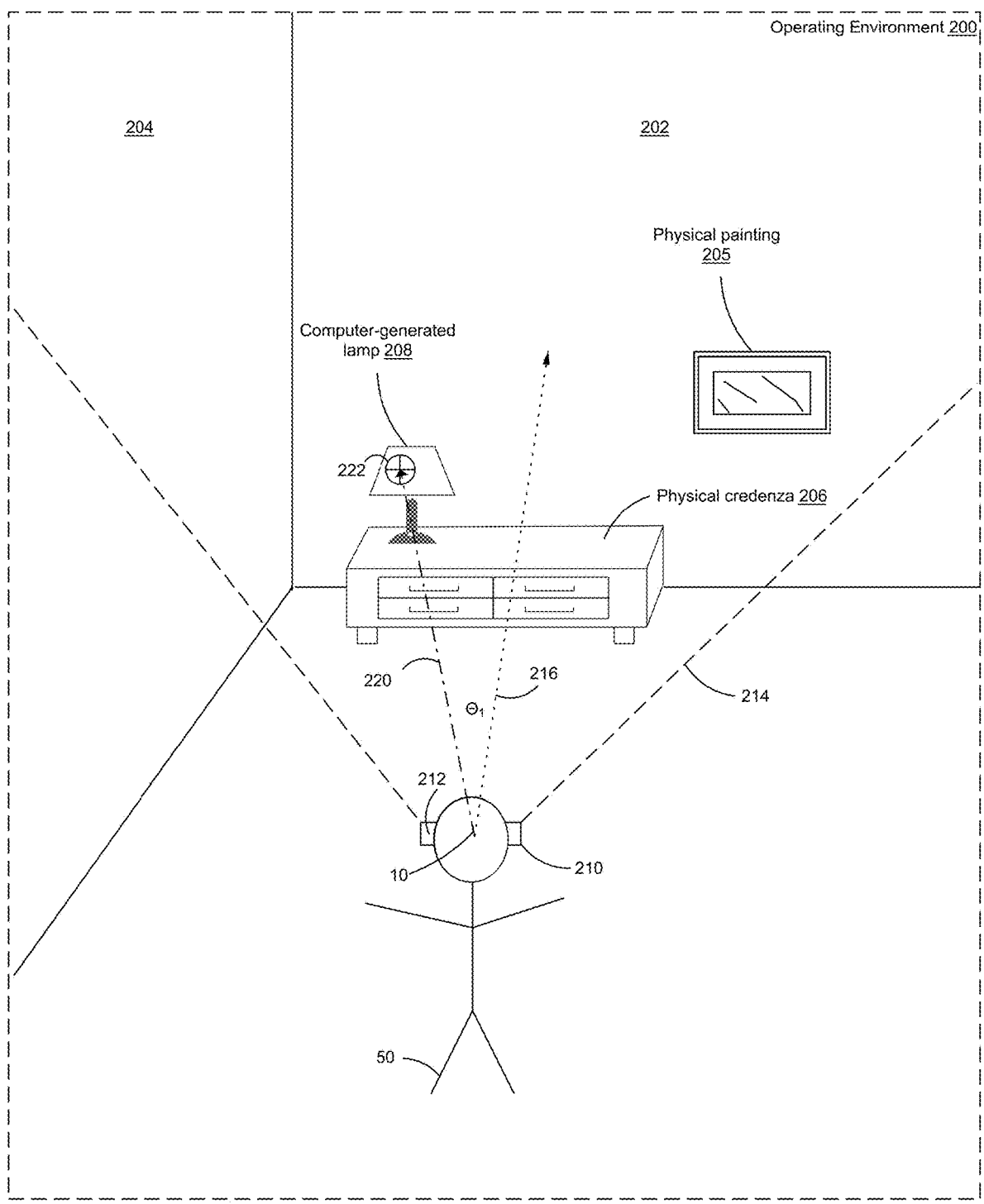

Referring to FIG. 2B, the HMD 210 determines a first gaze vector 220 associated with an eye 10 of the user 50. The first gaze vector 220 intersects with the first head forward vector 216 at a first angle $\theta_1$. Moreover, the first gaze vector 220 is associated with a first targeting region (e.g., a point of regard (POR) or gaze region) that intersects with the upper left portion of the computer-generated lamp 208. The first targeting region is indicated by a first reticle 222, which may or may not be displayed on the display 212.

Figure 4:
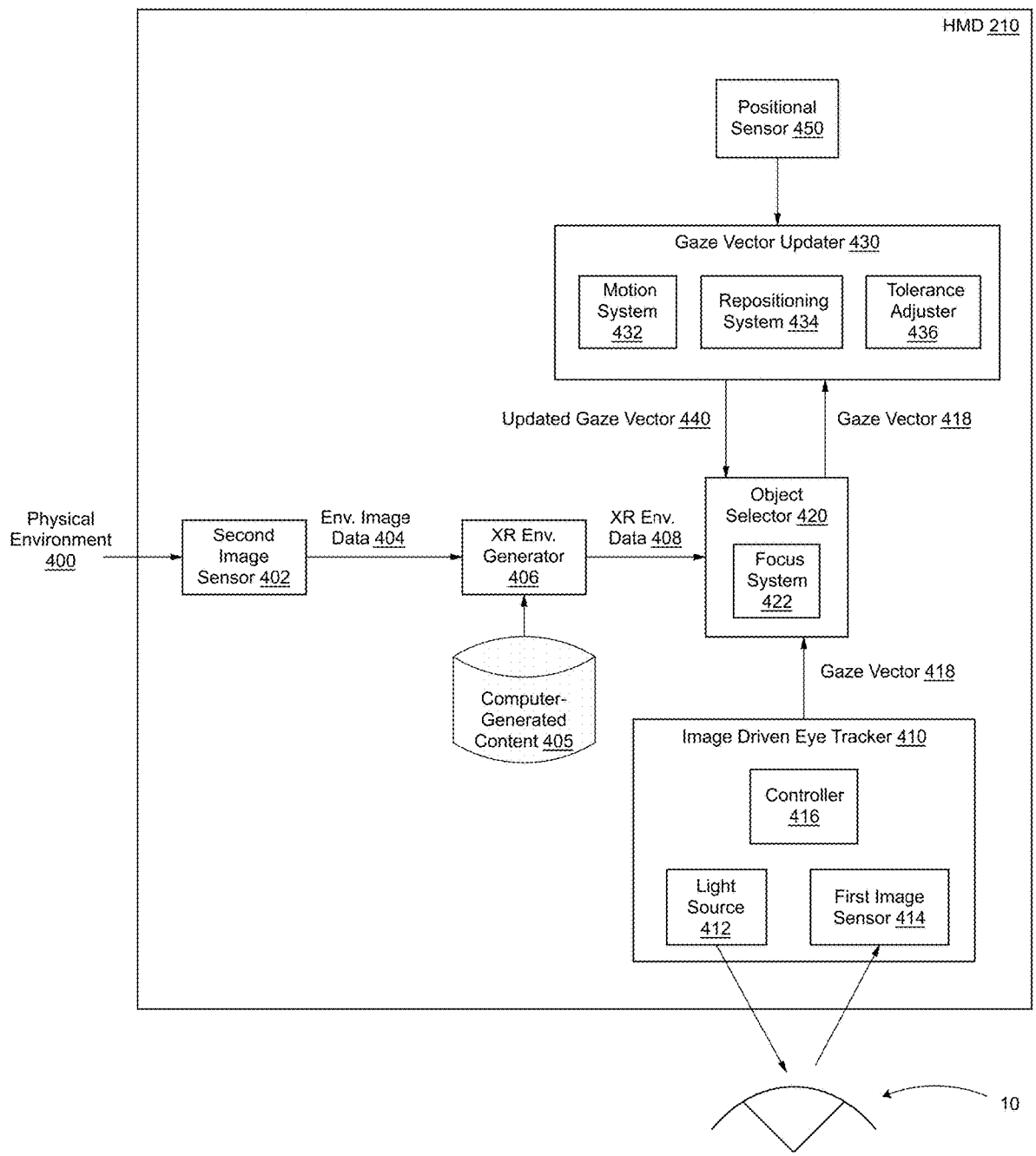
FIG. 4 is an example of a block diagram of a head-mountable device (HMD) that updates a gaze vector based on positional sensor data in accordance with some implementations.

With reference to FIG. 4, in order to determine a gaze vector 418 (e.g., the first gaze vector 220), the HMD 210 may include an image driven eye tracker 410. The image driven eye tracker 410 includes a light source 412, a first image sensor 414, and a controller 416.

The light source 412 emits light onto the eye 10 that reflects as a light pattern (e.g., a circle of glints) that can be detected by the first image sensor 414. Accordingly, the first image sensor 414 captures image data of the eye 10. Based on the light pattern, the controller 416 can determine an eye tracking characteristic of the eye 10. For example, the controller 416 determines the gaze vector 418 based on the image data. As one example, the controller 416 identifies a first subset of pixels of a first image of the image data, wherein the first subset of pixels corresponds to the eye 10.

The image data from the first image sensor 414 may include one or more images of the eye 10. For example, with reference to FIG. 3A, the image data includes a first image 300. The first image 300 includes a first representation 302 of the eye 10. The first representation 302 includes a pupil 306 surrounded by an iris 310, both covered by a cornea 308. The first representation 302 also includes a sclera 304 (also known as the white of the eye 10).

Figure 3A:
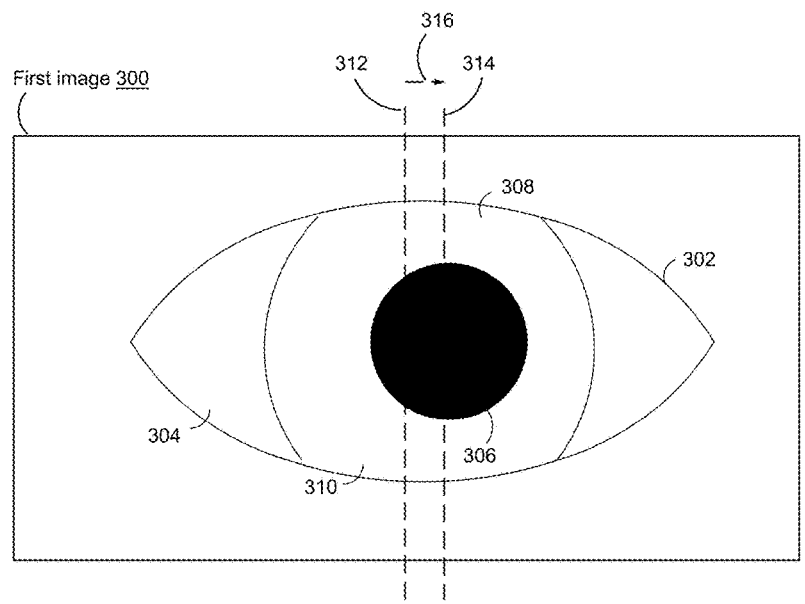
FIGS. 3A and 3B are an example of image data of an eye in accordance with some implementations.

In some implementations, the controller 416 determines the gaze vector 418 based on an offset vector associated with the first image 300. For example, as illustrated in FIG. 3A, a reference line 312 (illustrated for purely explanatory purposes) runs along the center of the first representation 302 of the eye 10. Moreover, the controller 416 determines a first eye position line 314 (illustrated for purely explanatory purposes). The first eye position line 314 runs along the center of the iris 310. For example, the first eye position line 314 intersects with the pupil 306. Moreover, the controller 416 determines a first offset vector 316 that relates the reference line 312 to the first eye position line 314. Namely, the first offset vector 316 points rightwards and has a magnitude corresponding to a distance between the reference line 312 and the first eye position line 314. Accordingly, with reference to FIG. 2B, based on the first offset vector 316 the controller 416 determines that the first gaze vector 220 points leftwards (opposite of the direction of the first offset vector 316) relative to the HMD 210, at the first angle $\theta_1$ that is based on the magnitude of the first offset vector 316.

With reference to FIG. 4, in some implementations, the HMD 210 includes an object selector 420 that selects an object represented in XR environment data 408, based on the gaze vector 418. The object may be computer-generated or physical. To that end, in some implementations, the HMD 210 includes a second image sensor 402 that captures environment image data 404 of a physical environment 400. Moreover, the HMD 210 may include an XR environment generator 406 that generates the XR environment data 408 based on the environment image data 404 and computer-generated content 405 (e.g., the computer-generated lamp 208). For example, with reference to FIG. 2B, the XR environment generator 406 composites the computer-generated lamp 208 with environment image data representing the first physical wall 202, the second physical wall 204, the physical painting 205, and the physical credenza 206. Referring back to FIG. 4, the object selector 420 selects the computer-generated lamp 208 based on the first gaze vector 220 intersecting with the computer-generated lamp 208. In some implementations, the object selector 420 includes a focus system 422, which determines a level of user focus with respect to an object. For example, the focus system 422 determines how long the eye 10 focuses on the object, and the object selector 420 selects the object when the length of the focus exceeds a threshold.

Referring back to FIG. 2B, in some implementations, the first gaze vector 220 is associated with a first targeting tolerance. The HMD 210 may use the first targeting tolerance to determine whether to target (e.g., select) a particular object of the operating environment 200. For example, the first targeting tolerance defines a first targeting region, which is indicated by the first reticle 222. In some implementations, a targeting region can be represented by a gaze cone positioned such that the apex of the gaze cone is located at an eye of a user and the gaze vector runs through the center of the gaze cone. The size of the targeting region at a particular location may be a function of a distance between a user and an object, or a distance between an electronic device (e.g., the HMD 210) and the object. For example, for a given distance between the user or electronic device and the object, the gaze cone has a corresponding radius that corresponds to the first targeting region. In these implementations, the targeting tolerance can be represented by the angle formed between the axis and surface of the gaze cone (e.g., larger tolerances correspond to larger angles, and smaller tolerances correspond to smaller angles). Continuing with this example, the HMD 210 targets (e.g., selects) the computer-generated lamp 208 because the first targeting region includes the computer-generated lamp 208.

Figure 2C:
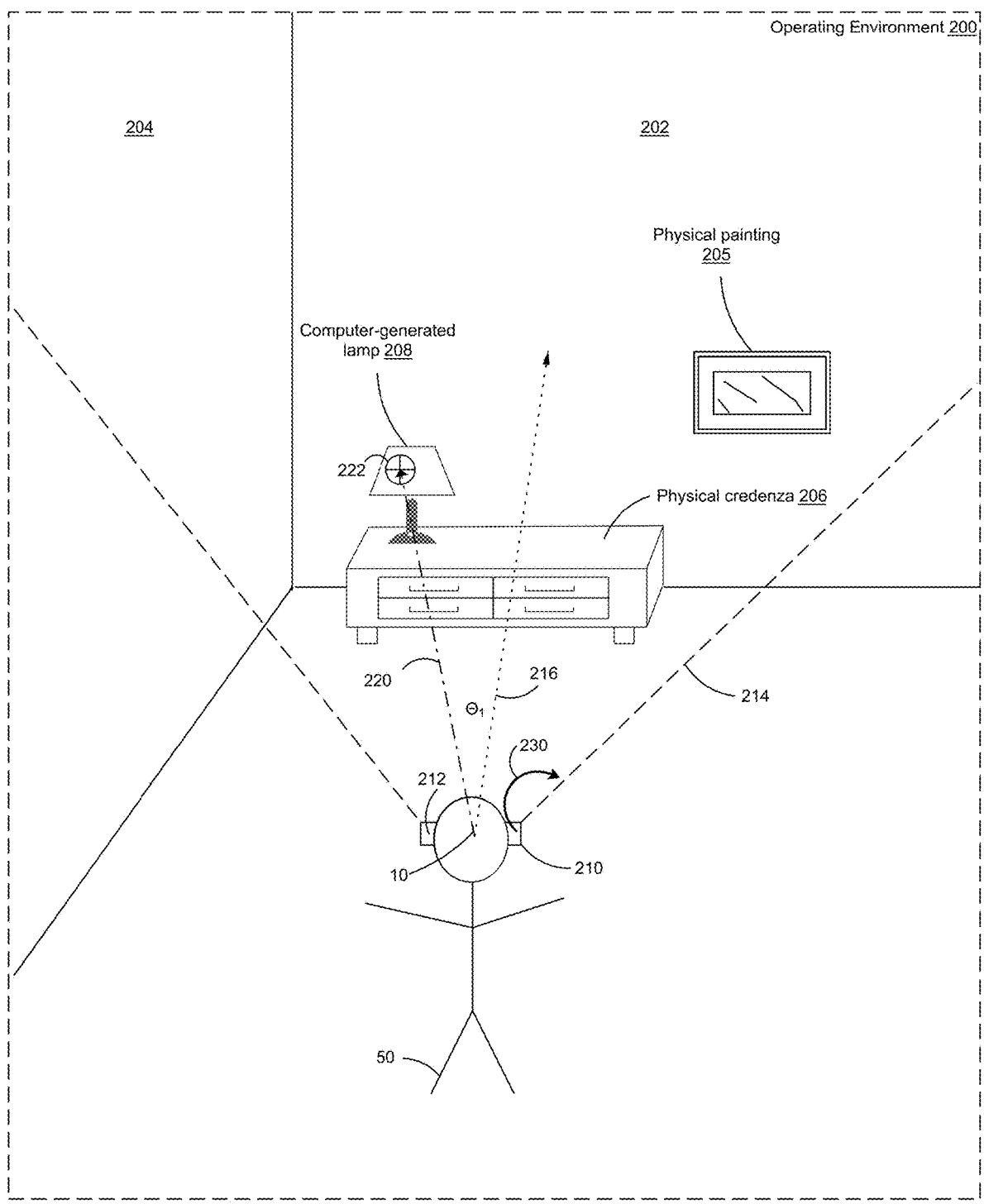
Figure 2D:
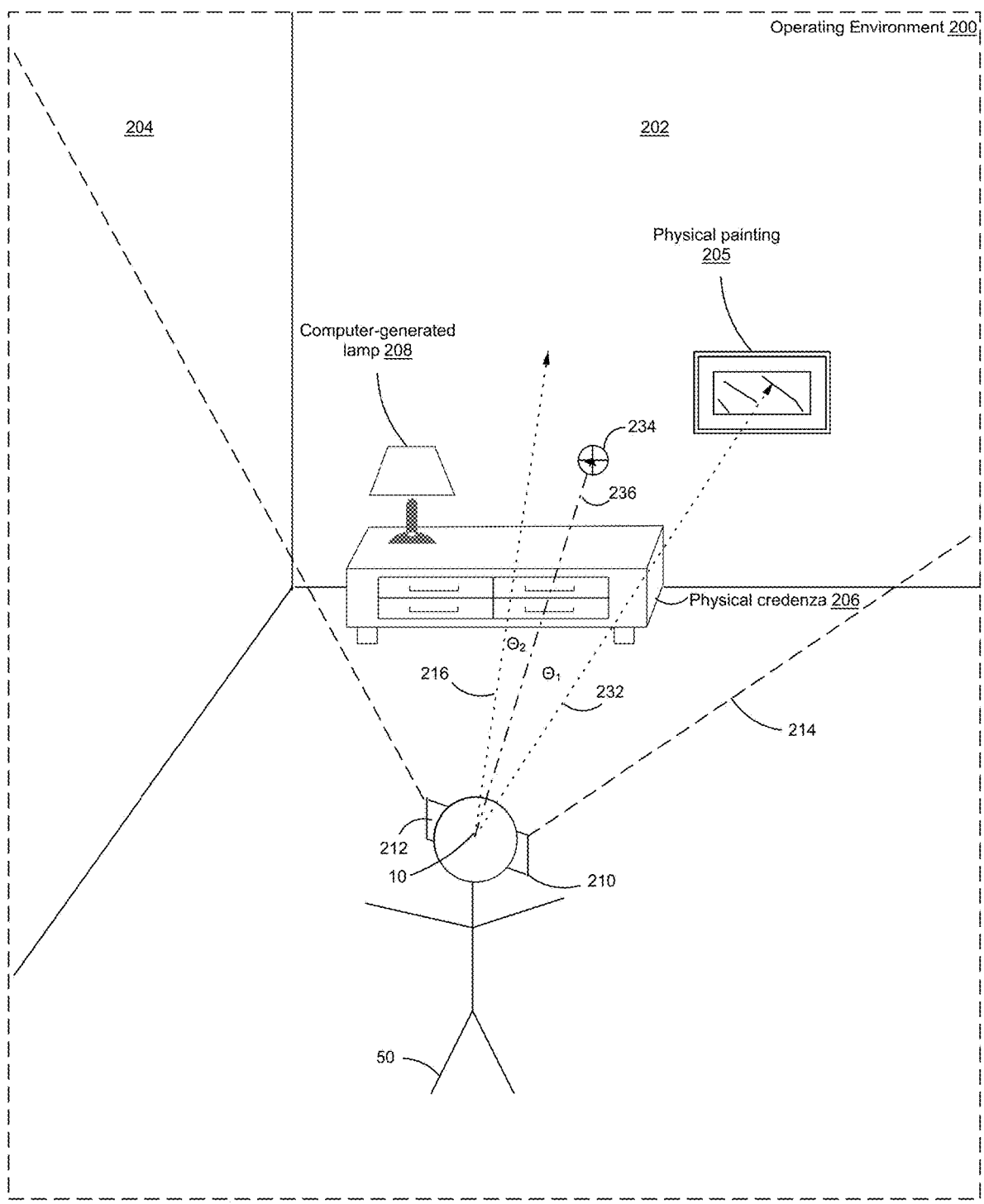
Figure 2E:
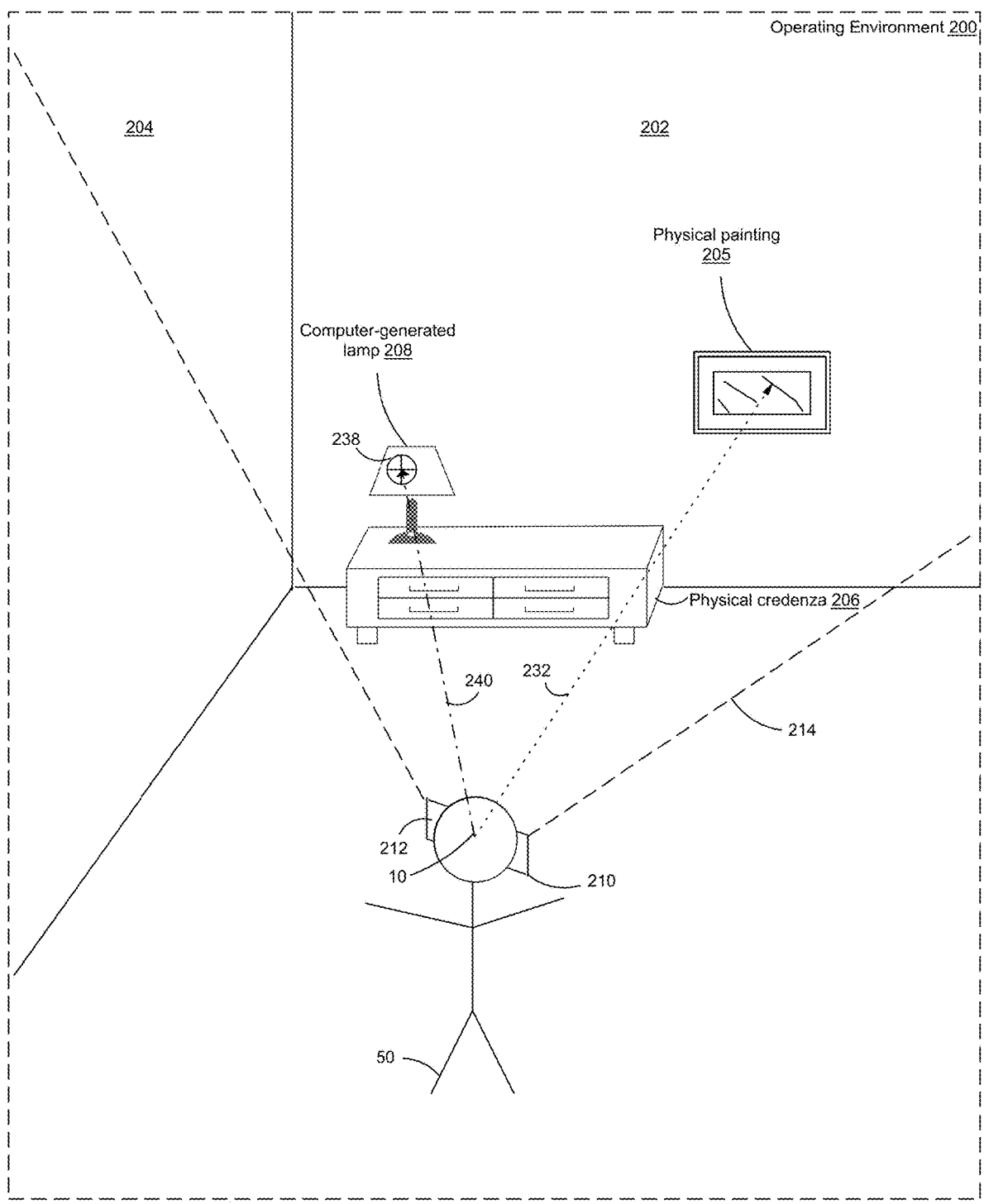

As illustrated in FIG. 2C, the user 50 initiates a first rightwards rotation of the HMD 210 from the first position to a second position, as indicated by a first rotation line 230. The second position is characterized by a second head forward vector 232, as illustrated in FIG. 2D. The second head forward vector 232 intersects with the physical painting 205. The HMD 210 receives positional sensor data indicative of the first rightwards rotation.

Figure 3B:
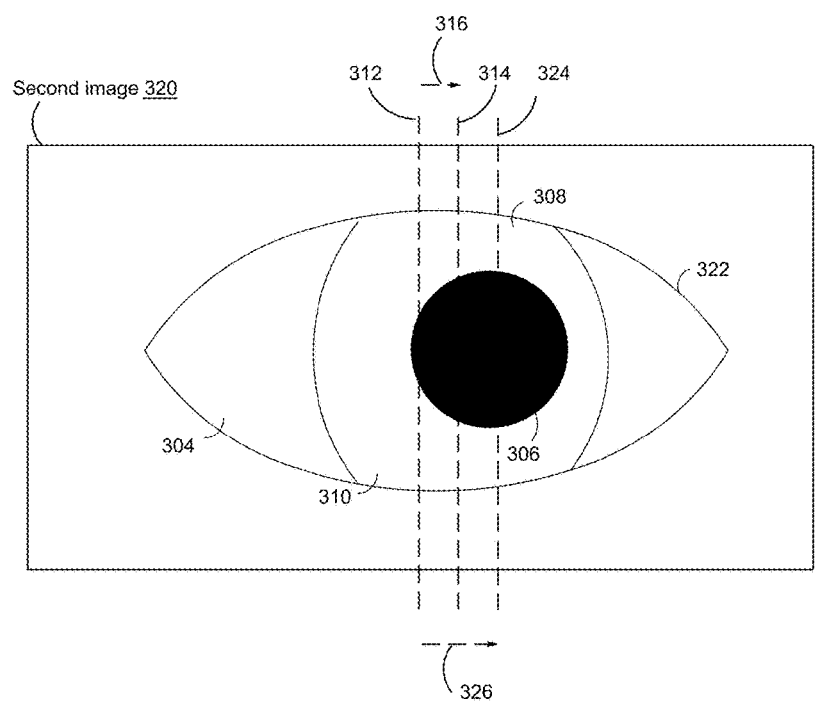

During the first rightwards rotation, the eye 10 maintains focus on the computer-generated lamp 208. For example, as illustrated in FIG. 3B, based on the first rightwards rotation of the HMD 210, the image sensor captures a second image 320. The second image 320 includes a second representation 322 of the eye 10. The position of the center of the iris 310 in the second image 320 is indicated by a second eye position line 324 (illustrated for purely explanatory purposes). The second eye position line 324 of the second image 320 is rightwards of the first eye position line 314 of the first image 300, because, in order to maintain focus on the computer-generated lamp 208, the eye 10 moves to counter the first rightwards rotation of the HMD 210. As illustrated in FIG. 3B, a second offset vector 326 relates the reference line 312 to the second eye position line 324. The second offset vector 326 points rightwards and has a magnitude corresponding to a distance between the reference line 312 and the second eye position line 324.

As described above, tracking (e.g., via computer vision) the movement of the eye 10 via the image driven eye tracker 410 is processor intensive and thus relatively slow. Accordingly, a substantial lag may exist between the generation of the positional sensor data (indicative of the first rightwards rotation), and the controller 410 determining the second eye position line 324. Before the image driven eye tracker 410 can determine the second eye position line 324, the image driven eye tracker 410 continues to identify the eye 10 within the first image 300. Accordingly, as illustrated in FIG. 2D, the image driven eye tracker 410 determines a first unsupplemented gaze vector 236 based on the position of the eye in the first image 300 (the first eye position line 314). Accordingly, as compared with the first gaze vector 220, the first unsupplemented gaze vector 236 is repositioned based on the first rightwards rotation of the HMD 210. The first unsupplemented gaze vector 236, therefore, is offset from the second head forward vector 232 according to the first angle $\theta_1$. The first unsupplemented gaze vector 236 is associated with a second targeting region that intersects with a portion of the first physical wall 202. The second targeting region is indicated by a second reticle 234. Moreover, the first unsupplemented gaze vector 236 is offset from the first head forward vector 216 according to a second angle $\theta_2$.

In order to supplement the relatively slow tracking of the movement of the eye within the image data, the HMD 210 assesses positional sensor data to update the unsupplemented first gaze vector 236. For example, with reference to FIG. 4, the HMD 210 may include a gaze vector updater 430 that updates the gaze vector 418 (e.g., the first unsupplemented gaze vector 236) based on the positional sensor data from the positional sensor 450, in order to determine an updated gaze vector 440. The positional sensor data is indicative of the positional change from the first position to the second position (e.g., the first rightwards rotation). To that end, in some implementations, the gaze vector updater 430 includes a motion system 432 that determines a supplemental positional value based on the positional sensor data. The supplemental positional value may include an angular change, positional displacement, movement speed, etc. For example, with reference to FIG. 2D, the motion system 432 determines an angular change of the HMD 210 resulting from the first rightwards rotation, wherein the angular change corresponds to the sum of the first angle $\theta_1$ and the second angle $\theta_2$. To that end, the motion system 432 may detect the first head forward vector 216 and the second head forward vector 232 based on the positional sensor data, and determine the angular change based on a difference between the first head forward vector 216 and the second head forward vector 232.

In some implementations, updating a gaze vector includes repositioning the gaze vector based on the supplemental positional value. To that end, in some implementations, the gaze vector updater 430 includes a repositioning system 434. For example, with reference to FIG. 2E, the repositioning system 434 repositions the first unsupplemented gaze vector 236 based on the angular change, in order to determine a repositioned gaze vector 240. The repositioned gaze vector 240 is associated with a third targeting region that intersects with the upper left portion of the computer-generated lamp 208, as indicated by a third reticle 238. Thus, the repositioned gaze vector 240 reflects the actual eye gaze of the user 50, which is maintained on the computer-generated lamp 208 during the first rightwards rotation of the HMD 210. The HMD 210, therefore, updates a gaze vector based on the positional sensor data, before determining the corresponding movement of an eye within image data (e.g., via computer vision). Illustration of the first head forward vector 216 is omitted from FIGS. 2E-2I for the sake of clarity. In some implementations, a known or estimated latency associated with the image driven eye tracker 410 may be determined and used by the repositioning system 434. For example, the repositioning system 434 may reposition the first unsupplemented gaze vector 236 using a supplemental positional value determined by the motion system 432 based on positional sensor data accumulated over a period of time corresponding to the known or estimated latency. In this way, a determined gaze vector 418 may be repositioned based on movement that has occurred since a previously determined gaze vector.

Figure 2F:
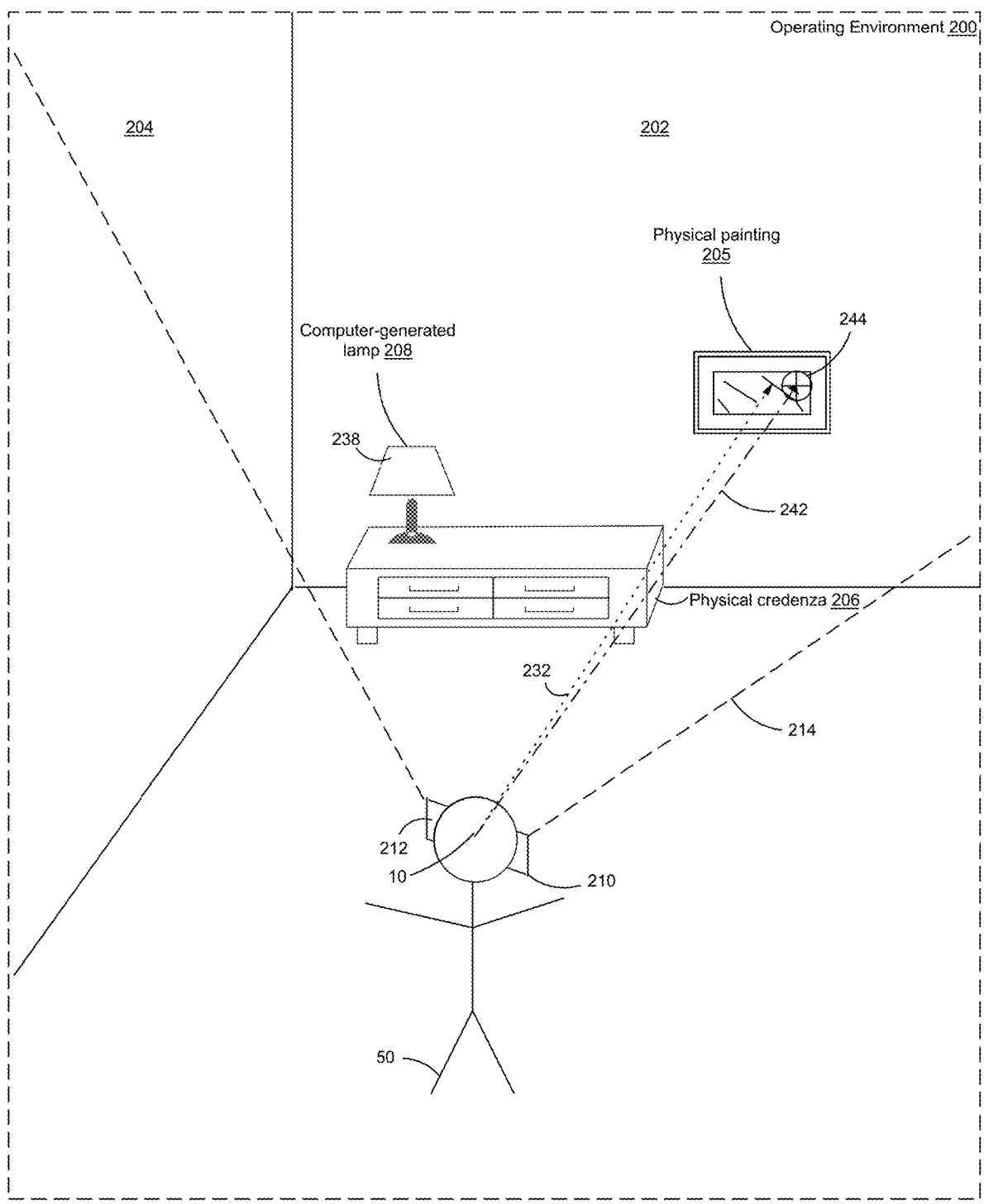

In some implementations, in addition to or instead of repositioning a gaze vector based on positional sensor data, updating the gaze vector includes changing a targeting threshold associated with the gaze vector based on the positional sensor data. To that end, in some implementations, the gaze vector updater 430 includes a tolerance adjuster 436. For example, as illustrated in FIG. 2F, while the HMD 210 is in the second position (associated with the second head forward vector 232), the HMD 210 determines a second gaze vector 242 based on image data of the eye 10. The second gaze vector 242 is associated with a fourth targeting region that intersects with a portion of the physical painting 205, wherein the fourth targeting region is indicated by a fourth reticle 244. In some implementations, the HMD 210 selects the physical painting 205 based on the intersection.

Figure 2G:
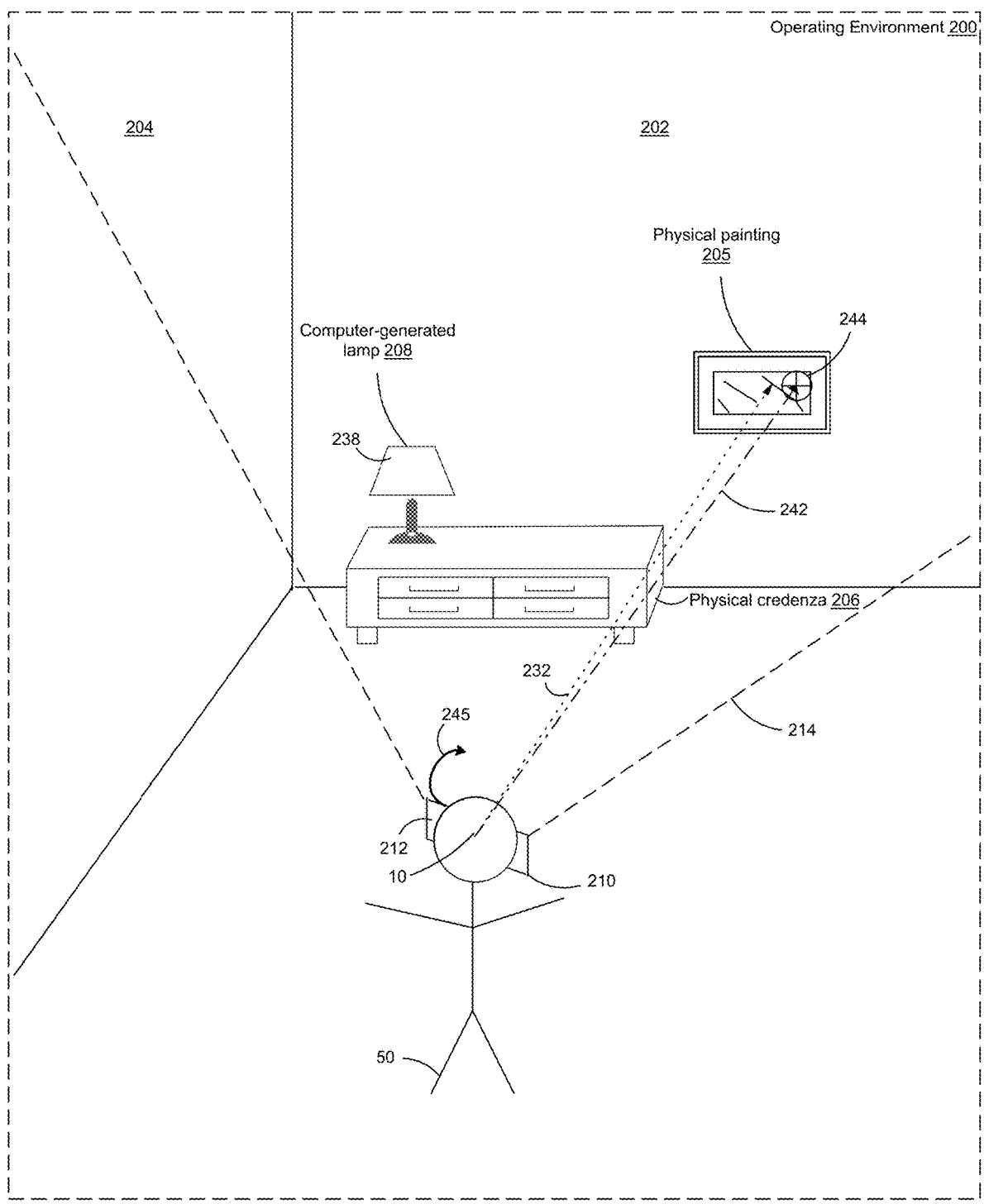

As illustrated in FIG. 2G, the user 50 initiates a second rightwards rotation of the HMD 210 from the second position to a third position, as indicated by a second rotation line 245. During the second rightwards rotation, the eye 10 remains focused on the physical painting 205. Moreover, during the second rightwards rotation, the HMD 210 receives positional sensor data indicative of the second rightwards rotation.

Figure 2H:
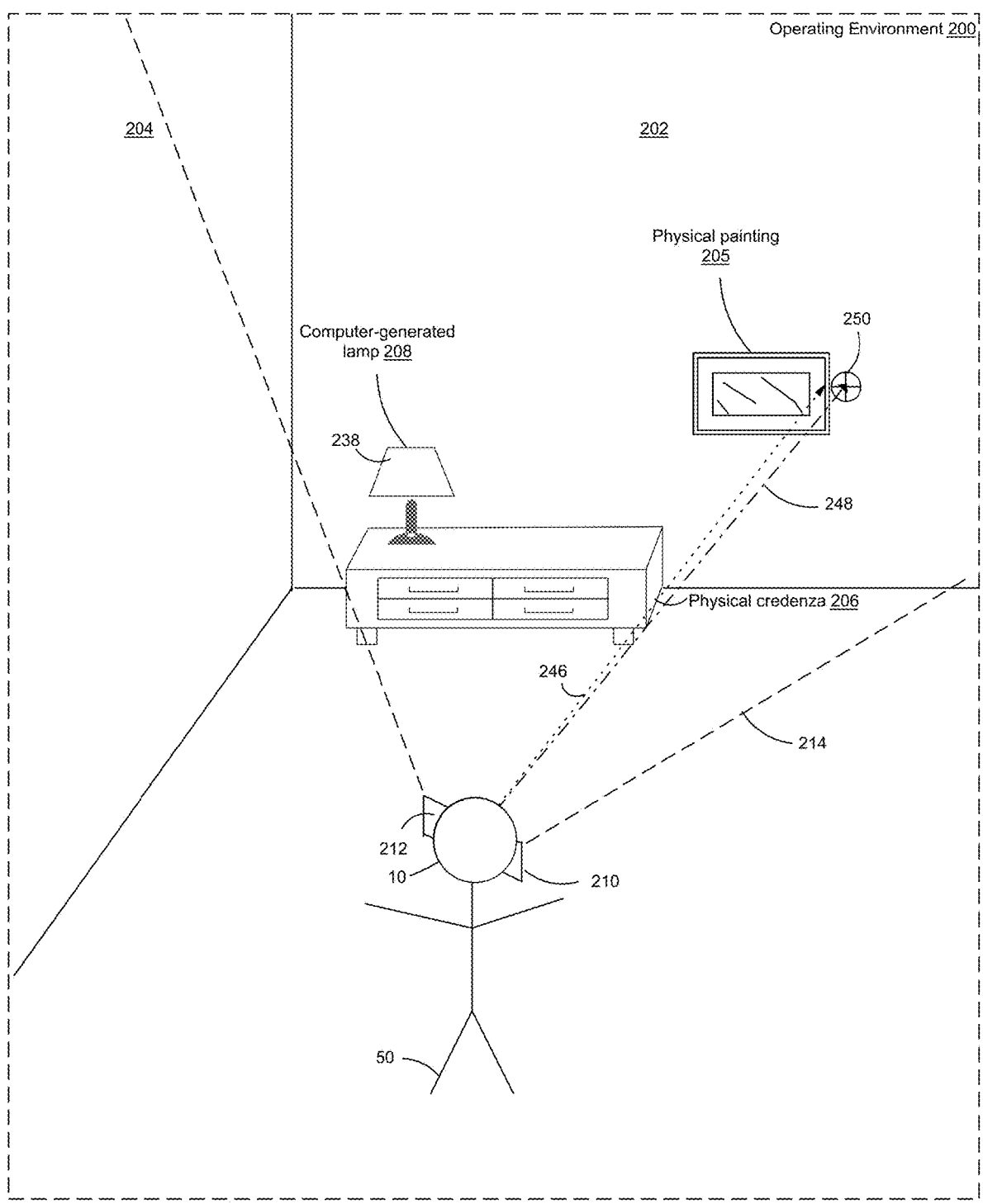

As illustrated in FIG. 2H, the second rightwards rotation changes the HMD 210 from the second head forward vector 232 to a third head forward vector 246. Illustration of the second head forward vector 232 is omitted from FIGS. 2H and 2I for the sake of clarity.

As described above with reference to FIG. 2D, a lag exists between the generation of the positional sensor data (indicative of the second rightwards rotation) and determination of a corresponding movement of the eye 10 within image data. Based on the lag, the HMD 210 determines a second unsupplemented gaze vector 248, as illustrated in FIG. 2H. The second unsupplemented gaze vector 248 is repositioned (relative to the second gaze vector 242) based on the second rightwards rotation. The second unsupplemented gaze vector 248 is associated with a fifth targeting region that includes a portion of the first physical wall 202, but does not include the physical painting 205. The fifth targeting region is indicated by a fifth reticle 250. Accordingly, the HMD 210 may cease to select the physical painting 205 based on the fifth targeting region, even though the eye 10 maintains focus on the physical painting 205.

Figure 2I:
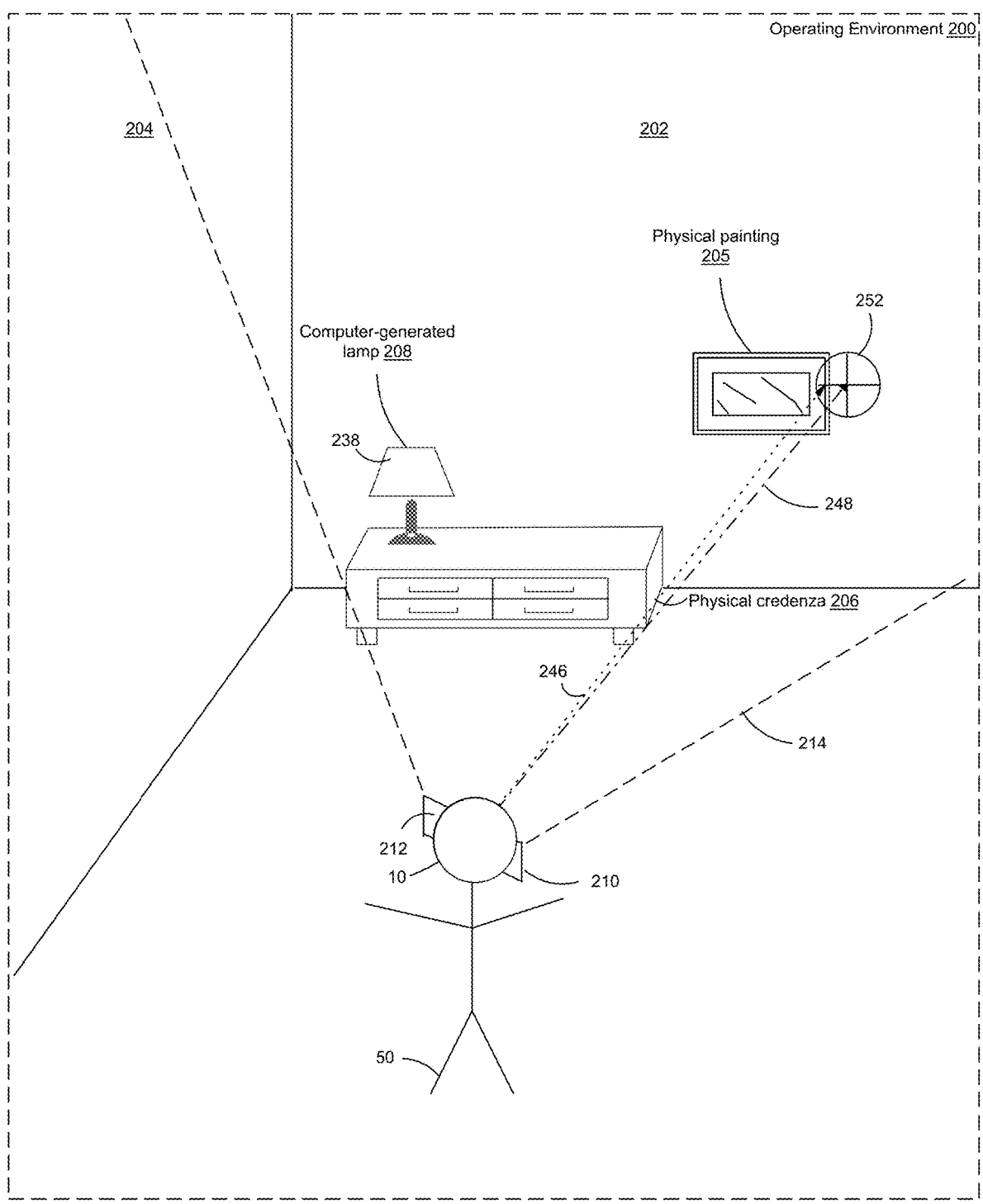

Accordingly, in some implementations, based on detecting the second rightwards rotation, the tolerance adjuster 436 increases a targeting tolerance associated with second unsupplemented gaze vector 248 in order to maintain targeting (e.g., selection) of the physical painting 205. In some implementations, the HMD 210 maintains the position of the unsupplemented gaze vector 248, while increasing the targeting tolerance. For example, as illustrated in FIG. 2I, the HMD 210 increases the targeting tolerance associated with second unsupplemented gaze vector 248 from the fifth targeting region to a sixth targeting region. The sixth targeting region is indicated by a sixth reticle 252. In contrast to the fifth targeting region, the sixth targeting region includes the physical painting 205. Accordingly, the HMD 210 is able to maintain targeting (e.g., selecting) of the physical painting 205 with greater confidence (e.g., more reliably).

In some implementations, the amount of the targeting tolerance increase (e.g., increase of the size of the targeting region) is based on the amount of an angular or lateral change associated with a detected positional change of the HMD 210. For example, with reference to FIGS. 2G-2I and FIG. 4, the motion system 432 determines an angular change based on the difference between the third head forward vector 232 and the fourth head forward vector 246. Continuing with this example, the amount of increase associated with changing from the fifth targeting region to a sixth targeting region is proportional or directly related to the angular change. In some implementations, the targeting tolerance is based on an amount of angular, lateral, or a combination of angular and lateral change associated with a detected positional change of the HMD 210 over a preceding window of time. For example, the targeting tolerance may be at a first value during a time in which HMD 210 remains relatively stationary. The targeting tolerance may temporarily increase to a second, larger value during a time in which HMD 210 undergoes quick rotational or lateral movement. The targeting tolerance may then lower to the first value after the HMD 210 returns to a relatively stationary state.

Figure 5:
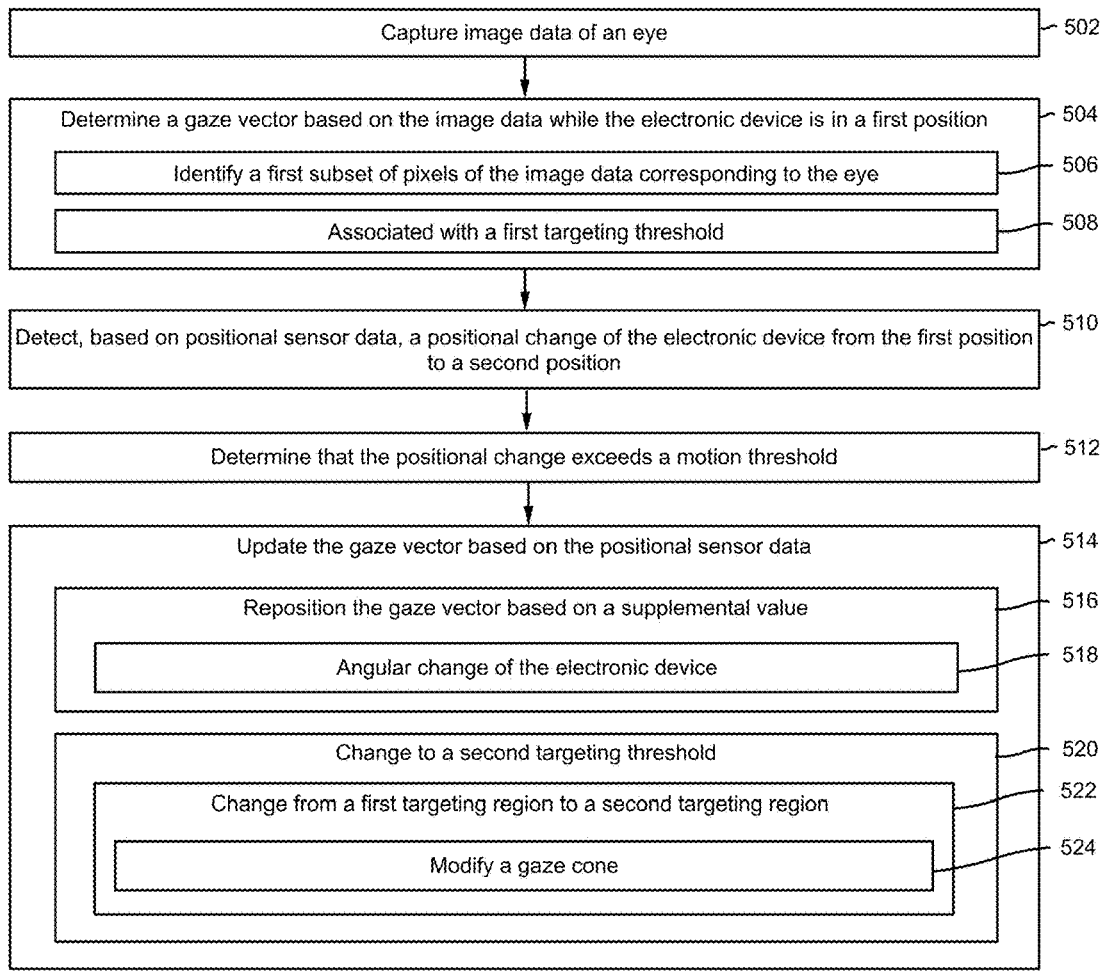
FIG. 5 is an example of a flow diagram of a method of updating a gaze vector based on positional sensor data in accordance with some implementations.

FIG. 5 is an example of a flow diagram of a method 500 of updating a gaze vector based on positional sensor data in accordance with some implementations. In various implementations, the method 500 or portions thereof are performed by an electronic device including image sensor(s) and a positional sensor, such as the HMD 210 described with reference to FIGS. 2A-2I, 3, and 4. In some implementations, the method 500 is performed by processing logic, including hardware, firmware, software, or a combination thereof. In some implementations, the method 500 is performed by a processor executing code stored in a non-transitory computer-readable medium (e.g., a memory). In various implementations, some operations in method 500 are, optionally, combined and/or the order of some operations is, optionally, changed.

As represented by block 502, the method 500 includes capturing image data of an eye using an image sensor of an electronic device performing the method 500. The image data may include a plurality of images of the eye, such as the first image 300 and the second image 320 respectively illustrated in FIGS. 3A and 3B. As one example, the image sensor corresponds to the first image sensor 414 in FIG. 4, wherein the first image sensor 414 captures image data of the eye 10 based on light emitted from the light source 412 onto the eye 10.

As represented by block 504, the method 500 includes, while the electronic device is in a first position, determining a gaze vector based on the image data. For example, with reference to FIGS. 2B and 3A, the HMD 210 captures a first image 300 of the eye 10, and determines the first gaze vector 220 based on an offset between the reference line 312 (running along the center of the eye 10) and the first eye position line 314 (running along the center of the iris 310) within the first image 300.

Determining the gaze vector may include identifying a position of an object that intersects with the gaze vector. For example, with reference to FIG. 2B, the HMD 210 identifies the position of the computer-generated lamp 208 with which the gaze vector 220 intersects (e.g., the first reticle 222).

In some implementations, determining the gaze vector includes performing computer vision with respect to the image data, such as instance segmentation or semantic segmentation. For example, as represented by block 506, determining the gaze vector includes identifying a first subset of pixels of the image data corresponding to the eye. Determining the gaze vector based on the image data may be associated with a first resource utilization level of the electronic device, such as a first number of processor cycles associated with the corresponding computer vision operation. In some implementations, the method 500 includes displaying a spatial selection indicator at a first position on the display corresponding to the gaze vector. The spatial selection indicator provides feedback to a user regarding the current gaze of the user.

As represented by block 508, in some implementations, the gaze vector is associated with a first targeting tolerance. For example, the first targeting tolerance characterizes the ease with which the gaze vector can target (e.g., select) a particular object. In some implementations, the first targeting tolerance defines a first targeting region associated with the gaze vector. For example, with reference to FIG. 2B, the gaze vector 220 is associated with the first targeting region, which is indicated by the first reticle 222. Continuing with this example, in some implementations, the HMD 210 selects the computer-generated lamp 208 because the first targeting region includes at least a portion of the computer-generated lamp 208.

In some implementations, the first targeting region characterizes a gaze cone, which may be used to determine whether or not to target an object. For example, the vertex of the gaze cone is positioned at an eye of a user, such that the gaze vector runs through the center of the gaze cone. In these implementations, the first targeting tolerance can be represented by the angle formed between the axis and surface of the gaze cone (e.g., larger tolerances correspond to larger angles, and smaller tolerances correspond to smaller angles). The radius of the gaze cone may be a function of a distance between an electronic device and an object. For example, for a given distance between the electronic device and the object, the gaze cone has a corresponding radius that corresponds to the first targeting region. As the distance between the electronic device and the object increases, the radius (and thus the size of the targeting region) increases. As the distance between the electronic device and the object decreases, the radius (and thus the size of the targeting region) decreases.

As represented by block 510, the method 500 includes detecting, based on positional sensor data from a positional sensor, a positional change of the electronic device from the first position to a second position. For example, with reference to FIGS. 2C and 2D, the HMD 210 detects the first rightwards rotation of the HMD 210, wherein the first rightwards rotation corresponds to an angular change from the first head forward vector 216 to the second head forward vector 232. As another example, with reference to FIGS. 2G and 2H, the HMD 210 detects the second rightwards rotation of the HMD 210, wherein the second rightwards rotation corresponds to an angular change from the second head forward vector 232 to the third head forward vector 246. In some implementations and with reference to FIG. 4, the positional sensor data from the positional sensor 450 indicates a plurality of positional values, wherein each of the plurality of positional values indicates the current position (e.g., orientation) of the HMD 210. Continuing with this example, the motion system 432 detects a positional change of the HMD 210 by assessing the plurality of positional values. The positional sensor data may include IMU data, magnetic sensor data (e.g., from a magnetic sensor that measures weak magnetic fields), etc. Examples of the positional change include a rotation, translational movement, shake movement, etc.

As represented by block 512, in some implementations, the method 500 includes determining that the positional change exceeds a motion threshold. For example and with reference to FIG. 4, the motion system 432 determines, based on positional sensor data from the positional sensor 450, that the positional change exceeds the motion threshold. Determining the positional change exceeds the motion threshold may include determining more than a threshold amount of angular change of the electronic device.

As represented by block 514, the method 500 includes, in response to detecting the positional change, updating the gaze vector based on the positional sensor data. In some implementations, updating the gaze vector based on the positional sensor data may include using positional sensor data accumulated over a period of time corresponding to a known or estimated latency associated with capturing the image data of the eye of the user (e.g., block 502) and processing the image data of the eye of the user (e.g., block 504). Updating the gaze vector may be associated with a second resource utilization level of the electronic device, such as a second number of processor cycles associated with processing the positional sensor data. The second resource utilization level may be less than the first resource utilization level, which is associated with determining the gaze vector based on the image data (block 504). For example, the method 500 includes performing computer vision on the image data to determine the gaze vector, which is more computationally expensive than updating the gaze vector based on the positional sensor data. In some implementations, updating the gaze vector is in response to determining that the positional change exceeds the motion threshold (block 512). In some implementations, updating the gaze vector occurs before detecting a movement of the eye from the first subset of pixels to a second subset of pixels of the image data. In other words, updating the gaze vector may be independent of the image data of the eye.

As represented by block 516, in some implementations, updating the gaze vector includes repositioning the gaze vector based on a positional supplement value. Examples of the positional supplement value includes an angular change, as represented by block 518. For example, with reference to FIG. 2D, the angular change is the sum of the first angle $\theta_1$ and the second angle $\theta_2$. As another example, before updating the gaze vector, the gaze vector is characterized by an initial angle, and repositioning the gaze vector includes changing the initial angle based on the angular change. As another example, with reference to FIGS. 2C-2E, the HMD 210 repositions the gaze vector 220 to the repositioned gaze vector 238 based on the angular change, which corresponds to the angular change resulting from the first rightwards rotation of the HMD 210. Continuing with this example, the HMD 210 detects the first head forward vector 216 (the first position of the HMD 210) and the second head forward vector 232 (the second position of the HMD 210), and assesses the difference thereof in order to determine the angular change. In some implementations, the method 500 includes, in further response to detecting the positional change, moving the spatial selection indicator to a second position on the display corresponding to the repositioned gaze vector.

In some implementations, repositioning the gaze vector is in further response to determining that the gaze vector satisfies a focus criterion with respect to an object. For example and with reference to FIG. 4, the focus system 422 determines that the gaze vector 418 intersects with a particular object within the XR environment data 408, and further determines that the intersection satisfies the focus criterion. To that end, the focus system 422 identifies a position of the object that intersects with the gaze vector. The focus criterion may be satisfied when the gaze vector intersects with the object for at least a threshold amount of time. The focus criterion may be satisfied when, after initially determining that the gaze vector intersects with the object, detecting less than a threshold amount of gaze drift. In some implementations, repositioning the gaze vector is further based on the position of the object. For example and with reference to FIG. 2B, the HMD 210 determines, based on the image data of the eye, that the gaze vector 220 satisfies the focus criterion with respect to the computer-generated lamp 208. Continuing with this example and with reference to FIG. 2E, the HMD 210 repositions the gaze vector 220 such that the repositioned gaze vector 240 also intersects with the computer-generated lamp 208.

As represented by block 520, in some implementations, updating the gaze vector includes updating the gaze vector from the first targeting tolerance to a second targeting tolerance. The second targeting tolerance is greater than the first targeting tolerance. To that end, the method 500 may include determining the second targeting tolerance based on the positional sensor data. The second targeting tolerance may account for anticipated lag associated with computer vision tracking of the eye within image data. For example, in some implementations, the method 500 includes maintaining the second targeting tolerance until completion of computer vision tracking of a movement of the eye within the image data, at which the method 500 may include restoring the first targeting tolerance. Accordingly, in some implementations, after updating the gaze vector to the second targeting tolerance, the method 500 includes continuing to track the eye of the user within the image data. For example, in some implementations, the method 500 includes detecting a movement of the eye from the first subset of pixels to a second subset of pixels of the image data.

In some implementations, while the gaze vector is associated with the second targeting tolerance, the method 500 includes determining that the gaze vector intersects with an object based on the image data. As one example and with reference to FIG. 2I, after the HMD 210 has increased the targeting tolerance to the sixth targeting region (indicated by the sixth reticle 252), the HMD 210 identifies the position of the eye within the image data in order to determine that the second unsupplemented gaze vector 248 intersects with the physical painting 205.

As represented by block 522, the second targeting tolerance may define a second targeting region associated with the gaze vector, wherein the second targeting region is larger than the first targeting region. For example, the second targeting region has a larger area or volume, as compared with the first targeting region. In some implementations, the size difference between the first and second targeting regions is based on (e.g., proportional to or directly related to) the amount or rate of device movement. As one example and with reference to FIGS. 2H and 2I, the HMD 210 increases from the fifth targeting region (indicated by the fifth reticle 250) to the sixth targeting region (indicated by the sixth reticle 252).

As represented by block 524, in some implementations, increasing the targeting region includes modifying a gaze cone. In some implementations, the method 500 includes targeting (e.g., selecting) an object with which the gaze cone intersects. The gaze cone may be positioned at an eye of a user, wherein the angle of the gaze cone is such that the gaze vector runs through the center of the gaze cone. Moreover, the radius of the gaze cone may vary based on a distance to the object with which the gaze vector intersects. For example, the radius of the gaze cone is larger nearer to the eye of the user (farther from the object). Modifying the gaze cone may include increasing the volume to increase the targeting region. Additionally or alternatively, modifying the gaze cone may include changing the angle of gaze cone (relative to eye of user).

Updating the gaze vector may include repositioning the gaze vector and updating (e.g., increasing) the targeting tolerance associated with the gaze vector.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   at an electronic device with one or more processors, a non-transitory memory, an image sensor, and a positional sensor:
   capturing image data of an eye using the image sensor;
   while the electronic device is in a first position, determining a gaze vector based on the image data;
   detecting, based on positional sensor data from the positional sensor, a positional change of the electronic device from the first position to a second position over a period of time corresponding to latency associated with capturing and processing the image data; and
   in response to detecting the positional change, updating the gaze vector based on the positional sensor data accumulated during the period of time before detecting the positional change based on the image data.

2. The method of claim 1, wherein updating the gaze vector includes:
   determining a supplemental positional value based on the positional sensor data; and
   repositioning the gaze vector based on the positional supplement value.

3. The method of claim 2, wherein determining the supplemental positional value includes:
   identifying a portion of the positional sensor data corresponding to the latency; and
   assessing the portion of the positional sensor data in order to determine the supplemental positional value.

4. The method of claim 2, wherein the supplemental positional value corresponds to an angular change of the electronic device, wherein updating the gaze vector includes repositioning the gaze vector based on the angular change.

5. The method of claim 4, wherein before updating the gaze vector the gaze vector is characterized by an initial angle, and wherein repositioning the gaze vector includes changing the initial angle based on the angular change.

6. The method of claim 4, wherein the first position is associated with a first head forward vector, wherein the second position is associated with a second head forward vector, and wherein the angular change corresponds to an angle between the first head forward vector and the second head forward vector.

7. The method of claim 2, wherein determining the gaze vector includes identifying a position of an object that intersects with the gaze vector, and wherein repositioning the gaze vector is further based on the position of the object.

8. The method of claim 7, wherein repositioning the gaze vector is in further response to determining that the gaze vector satisfies a focus criterion with respect to the object.

9. The method of claim 2, wherein repositioning the gaze vector is independent of the image data.

10. The method of claim 2, wherein the electronic device includes a display, the method further comprising:
    while the electronic device is in the first position displaying a spatial selection indicator at a first position on the display corresponding to the gaze vector; and
    in further response to detecting the positional change, moving the spatial selection indicator to a second position on the display corresponding to the repositioned gaze vector.

11. The method of claim 10, wherein, before updating the gaze vector, the gaze vector is associated with a first targeting tolerance, and wherein updating the gaze vector includes:
    determining, based on the positional sensor data, a second targeting tolerance that is greater than the first targeting tolerance; and
    updating the gaze vector from the first targeting tolerance to the second targeting tolerance.

12. The method of claim 11, further comprising, while the gaze vector is associated with the second targeting tolerance, determining that the gaze vector intersects with an object based on the image data.

13. The method of claim 11, wherein the first targeting tolerance defines a first targeting region associated with the gaze vector, wherein the second targeting tolerance defines a second targeting region associated with the gaze vector, and wherein the second targeting region is larger than the first targeting region.

14. The method of claim 13, further comprising:
    selecting an object in accordance with a determination that the gaze vector intersects with the object within the first targeting tolerance; and
    after updating the gaze vector, maintaining selection of the object in accordance with a determination that the gaze vector intersects with the object within the second targeting tolerance.

15. The method of claim 14, wherein the gaze vector intersects with the object within the first targeting tolerance based on the first targeting region including the object, and wherein the gaze vector intersects with the object within the second targeting tolerance based on the second targeting region including the object.

16. The method of claim 13, wherein the first targeting region characterizes a gaze cone, and wherein updating the gaze vector includes modifying the gaze cone in order to change from the first targeting region to the second targeting region.

17. The method of claim 1, wherein updating the gaze vector is further in response to determining that the positional change exceeds a motion threshold.

18. The method of claim 1, wherein determining the gaze vector includes identifying a first subset of pixels of the image data corresponding to the eye, and wherein updating the gaze vector occurs before detecting a movement of the eye from the first subset of pixels to a second subset of pixels of the image data.

19. An electronic device comprising:
    one or more processors;
    a non-transitory memory;
    an image sensor;
    a positional sensor; and
    one or more programs, wherein the one or more programs are stored in the non-transitory memory and configured to be executed by the one or more processors, the one or more programs including instructions for:
        capturing image data of an eye using the image sensor;
        while the electronic device is in a first position, determining a gaze vector based on the image data;
        detecting, based on positional sensor data from the positional sensor, a positional change of the electronic device from the first position to a second position over a period of time corresponding to latency associated with capturing and processing the image data to determine the gaze vector; and
        in response to detecting the positional change, updating the gaze vector based on the positional sensor data accumulated during the period of time before detecting the positional change based on the image data.

20. A non-transitory computer readable storage medium storing one or more programs, the one or more programs comprising instructions, which, when executed by an electronic device with one or more processors, an image sensor, and a positional sensor, cause the electronic device to:
    capture image data of an eye using the image sensor;
    while the electronic device is in a first position, determine a gaze vector based on the image data;
    detect, based on positional sensor data from the positional sensor, a positional change of the electronic device from the first position to a second position over a period of time corresponding to latency associated with capturing and processing the image data to determine the gaze vector; and
    in response to detecting the positional change, update the gaze vector based on the positional sensor data accumulated during the period of time before detecting the positional change based on the image data.

* * * * *